(12) United States Patent
Monoi

(10) Patent No.: US 6,169,576 B1
(45) Date of Patent: Jan. 2, 2001

(54) SOLID STATE IMAGE SENSING DEVICE HAVING VARIABLE RESOLUTION AND COLOR LINEAR IMAGE SENSOR HAVING VARIABLE RESOLUTION AND CONTROL METHOD THEREOF

(75) Inventor: Makoto Monoi, Meguro-ku (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/877,330

(22) Filed: Jun. 17, 1997

(30) Foreign Application Priority Data

Jun. 18, 1996 (JP) .................................................. 8-157031

(51) Int. Cl.[7] ................. H04N 3/14; H04N 1/46
(52) U.S. Cl. ............................. 348/272; 358/514
(58) Field of Search ..................... 348/262, 265, 348/272, 324, 316, 323, 277, 319, 321; 358/514, 513; 257/231, 234, 225, 232, 249

(56) References Cited

U.S. PATENT DOCUMENTS

| | | | |
|---|---|---|---|
| 5,105,264 | * 4/1992 | Erhardt | 257/234 |
| 5,237,190 | * 8/1993 | Wu et al. | 257/234 |
| 5,340,977 | * 8/1994 | Kojima et al. | 257/234 |
| 5,539,536 | * 7/1996 | Maki et al. | 348/316 |
| 5,703,640 | * 12/1997 | Miwda | 257/232 |
| 5,751,032 | * 5/1998 | Yu | 257/231 |
| 5,767,901 | * 6/1998 | Kimura | 348/324 |
| 5,784,101 | * 7/1998 | Hasegawa | 348/316 |
| 5,841,554 | * 11/1998 | Hasegawa | 358/514 |

* cited by examiner

Primary Examiner—Tuan Ho
Assistant Examiner—Luong Nguyen
(74) Attorney, Agent, or Firm—Finnegan, Henderson, Farabow, Garrett, & Dunner, L.L.P.

(57) ABSTRACT

A color linear image sensor includes first, second and third photosensitive pixel trains disposed in parallel in a manner close to each other, wherein an interpixel transfer section (10) for holding signal charges produced at the second photosensitive pixel train is provided between the second and third photosensitive pixel trains (12, 13). Since read-out operation from the second photosensitive pixel train is carried out by CCD register via the third photosensitive pixel train in the state where holding time is controlled by the interpixel transfer section, it is possible to freely adjust the integral time and the read-out timing.

21 Claims, 9 Drawing Sheets

SOLID STATE IMAGE SENSING DEVICE HAVING VARIABLE RESOLUTION AND COLOR LINEAR IMAGE SENSOR HAVING VARIABLE RESOLUTION AND CONTROL METHOD THEREOF

BACKGROUND OF THE INVENTION

This invention relates to a solid state image sensing device, a color linear image sensor, and a method for controlling storage of signal charges in a color linear image sensor.

Hitherto, as a picture input element of a color scanner and a color copy machine, three-line CCD linear image sensors have been widely used. An example of such a linear image sensor will now be described with reference to FIG. 8.

FIG. 8 is a model view showing outline of the structure of a three-line CCD linear image sensor. Photosensitive pixel trains $1_1$, $1_2$, $1_3$ arranged in parallel to each other produce a group of signal charges corresponding to one scanning which correspond to light quantity of picture image projected through optical system (not shown). Above the respective photosensitive pixel trains, different color filters are formed. For example, red (R) filter is formed above the photosensitive pixel train $1_1$, green (G) filter is formed above the photosensitive pixel train $1_2$, and blue (B) filter is formed above the photosensitive pixel train $1_3$. As a result, the red component, the green component and the blue component of image are respectively taken out from the photosensitive pixel trains $1_1$, $1_2$, $1_3$. As stated above, the respective photosensitive pixel trains produce outputs of any colors of R, G, B with respect to the image corresponding to 1 line of scanning.

Moreover, CCD registers $3_1$-$3_3$ for transferring signal charges produced are respectively disposed in parallel to corresponding photosensitive pixel trains $1_1$-$1_3$, and shift sections $2_1$-$2_3$ for carrying out shift operation of signal charges from the photosensitive pixel trains to the CCD registers are respectively provided between the photosensitive pixel trains and the CCD registers corresponding to each other.

At the front end portions in the transfer direction of the respective CCD registers $3_1$-$3_3$, there are provided amplifiers $4_1$-$4_3$ for converting output charges of the CCD registers $3_1$-$3_3$ into electric signals to output them as picture signals of R, G, B.

In such a configuration, when two-dimensional image is projected onto photosensitive pixel trains $1_1$-$1_3$ by scanning of optical system (not shown) or movement of object to be read such as manuscript, etc., signal charges are stored into photosensitive pixels of the respective photosensitive pixel trains. After a predetermined storage time, the signal charges stored in the respective photosensitive pixels of the photosensitive pixel trains are transferred to the CCD registers $3_1$-$3_3$ by the shift sections $2_1$-$2_3$, and are sequentially transferred within the CCD registers $3_1$-$3_3$. The signals thus transferred are outputted from the amplifiers $4_1$-$4_3$. Such a series of shift, transfer and output operations are carried out in synchronism with a clock signal delivered from control section (not shown) and transfer pulse generated on the basis of this clock signal. A fixed operation is repeated every predetermined time corresponding to 1 line of scanning.

In the three-line sensor having RGB output constituted as described above, since these three lines respectively include the photosensitive pixel trains, the shift sections and the CCD registers, size between pixel trains in the subscanning direction (the direction perpendicular to the photosensitive pixel train) is large, and times until respective line sensors reach the same position of image are different. For this reason, it is necessary to adjust read timings from respective lines.

Namely, since three signals of R picture signal, G picture signal and B picture signal of color image to be obtained are required to take the same position on the time axis, an approach is employed for allowing positions on the time axis of respective picture signals to be in correspondence with each other to sequentially store respective picture signals into image memories to adjust read-out timings from the respective image memories to thereby allow line information of RGB picture signals to be in correspondence with each other.

As stated above, in the three-line CCD sensor constituted as shown in FIG. 8, in order to correct positional differences between photosensitive pixel trains, memories are required at the system side for carrying out image processing. In addition, in order to carry out correction of broad range, the memory capacities thereof were required to be extremely large.

In recent years, there has been proposed a configuration of the line proximity type in which the distances between respective photosensitive pixel trains are caused to be narrow in order to reduce the memory capacity. FIG. 9 is a model view showing such an example.

In FIG. 9, the same reference numerals are respectively given to the portions corresponding to those of FIG. 8, and explanation of such portions will be omitted. In this configuration, photosensitive pixel trains $1_1$-$1_3$ are disposed in a manner adjacent to each other and shift section $2_2$ is disposed between the second photosensitive pixel train $1_2$ and the third photosensitive pixel train $1_3$. On these photosensitive pixel trains $1_1$, $1_2$, $1_3$, color filters of red, green and blue, etc. are respectively formed. In this example, drive voltage pulses, etc. are suitably applied to the respective shift sections and the respective CCD registers from control section (not shown).

The read operation of the device shown in FIG. 9 will now be described with reference to the signal timing diagram of FIG. 10.

Initially, at time $T_1$, drive voltage pulse $V_{21}$ is applied to the shift section $2_1$. As a result, signal charges corresponding to one line produced at the photosensitive pixel train $1_1$, are transferred to the CCD register $3_1$ through the shift section $2_1$. At time $T_2$, drive voltage pulse $V_{23}$ is applied to the shift section $2_3$. As a result, signal charges corresponding to one line produced at the photosensitive pixel train $1_3$ are transferred to the CCD register $3_2$ through the shift section $2_3$. At time $T_3$, drive voltage pulse $V_{24}$ is applied to the shift section $2_4$. As a result, signal charges of the CCD register $3_2$ are transferred to the CCD register $3_3$ through the shift section $2_4$. At time $T_4$, drive voltage pulse $V_{22}$ is applied to the shift section $2_2$. As a result, signal charges corresponding to one line of the photosensitive pixel train $1_2$ are transferred to the photosensitive pixel train $1_3$ through the shift section $2_2$. At time $T_5$, drive voltage pulse $V_{23}$ is applied to the shift section $2_3$. As a result, the signal charges corresponding to one line which have been transferred to the photosensitive pixel train $1_3$ are transferred to the CCD register $3_2$ through the shift section $2_3$.

The signal charges corresponding one line respectively held at the CCD registers $3_1$-$3_3$ are transferred to amplifiers (output sections) $4_1$, $4_2$ and $4_3$ at the same time or suitably. Thus, respective picture signals of R, G and B are outputted.

In accordance with the configuration shown in FIG. 9, as compared to the conventional configuration in which CCD registers are disposed between respective photosensitive pixel trains, because it is sufficient to provide only the shift section $2_2$ between three photosensitive pixel trains, the distances between respective photosensitive pixel trains can be reduced. Accordingly, the memory capacity used for adjustment of positions on the time axis of respective picture signals of R, G and B produced resulting from the fact that positions of the photosensitive pixel trains of R, G and B are spaced to each other can be reduced.

Meanwhile, there are proposed image sensors adapted to have ability of carrying out enlargement/contraction or change in reading accuracy of image to be read. In such image sensors, there are instances where the resolution in the sub-scanning direction is switched in correspondence with such a change.

However, in typical three-line sensors, the distances between photosensitive pixel trains are ordinarily fixed to value which is multiple of integer of the pixel width. Let now consider the sensor in which, e.g., the pixel width and pitch between photosensitive pixel trains are 10 $\mu$m. In more practical sense, when in the case where the resolution is switched from ordinary 300 DPI to 200 DPI, the scanning speed is increased so that a speed 1.5 times greater than the original speed is provided without changing storage time of signal charges in order to save the entire scanning time to carry out subscanning of 15 $\mu$m which is not equimultiple (does not correspond to the pixel width) of picture to be read, control for allowing respective photosensitive pixel trains to read picture at the same position becomes difficult.

The reason thereof will be explained with reference to FIGS. 11A to 14.

FIGS. 11A and 11B show the state where the pixel opening moves in the sub-scanning direction X on the manuscript. Scale described at the upper portion of FIG. 11A indicates position on the manuscript. When magnification (contraction ratio) of the optical system is assumed to be A, the manuscript is scanned every 10A $\mu$m as shown in FIG. 11B.

$T_1$, $T_2$, $T_3$ are timings, and the shapes of the parallelograms illustrated indicate changes of positions of the pixel openings at an ordinary scanning speed. Moreover, line segments illustrated at the lowermost portion in the figure indicate the ranges within which the pixel opening is to be moved. As apparent from FIG. 11A, in the case of this ordinary scanning, positional changes of respective pixel openings are all in correspondence with arbitrary ones of ranges within which the pixel openings are to be moved.

Accordingly, as shown in FIG. 12, timings of shift pulses $SH_R$, $SH_G$, $SH_B$ with respect to respective colors are all in correspondence with each other.

Changes of positions of the pixel openings when the resolution is caused to be coarse to carry out scanning of 1.5 times are shown in FIG. 13. In this case, the reading range of R is correct at all times, but G, B pixel openings deviate from the range within which pixel is to be primarily moved, so R, G, B (pixels) do not read the same range. In addition, such problem takes place entirely in the same manner also in the case where the distance between photosensitive pixel trains is not equimultiple of (i.e., the same as) the pixel width, but is multiple of integer thereof.

In view of the above, in the configuration shown in FIG. 8, read-out timings from the photosensitive pixel trains $1_1$, $1_2$, $1_3$ are shifted by the shift sections $2_1$, $2_2$, $2_3$ as shown in FIG. 14 so that the respective photosensitive pixel trains can read the same portion.

However, in the line proximity type sensor shown in FIG. 9, since signal charges of the photosensitive pixel train $1_2$ are necessarily passed through the photosensitive pixel train $1_3$, the read-out timing cannot be freely changed, giving rise to the problem that the resolution conversion of the sensor cannot be carried out.

SUMMARY OF THE INVENTION

Accordingly, an object of this invention is to provide a color linear image sensor having plural lines close to each other and capable of independently controlling the starting points of the integral time periods at the respective photosensitive pixel trains.

In accordance with the first aspect of this invention, there is provided a color linear image sensor comprising first, second and third photosensitive pixel trains closely disposed substantially in parallel to each other and adapted for respectively producing signal charges with respect to different colors; a first charge transfer section disposed substantially in parallel to the first photosensitive pixel train and adapted for transferring a series of signal charges produced at the first photosensitive pixel train; a second charge transfer section disposed substantially in parallel to the third photosensitive pixel train and adapted for transferring signal charges produced at the second photosensitive pixels train; a first shift section disposed between the first photosensitive pixel train and the first charge transfer section and adapted for carrying out shift or transfer operation of the signal charges produced at the first photosensitive pixel train to the first charge transfer section; a second shift section disposed between the third photosensitive pixel train and the second charge transfer section and adapted for carrying out shift or transfer operation of the signal charges produced at the second photosensitive pixel train to the second charge transfer section through the third photosensitive pixel train; and an interpixel transfer section provided between the second photosensitive pixel train and the third photosensitive pixel train and adapted for carrying out shift or transfer operation of the signal charges produced at the second photosensitive pixel train to the third photosensitive pixel train while holding them.

It is preferable that the interpixel transfer section used here comprises a first interpixel shift section for carrying out shift or transfer operation of the signal charges produced at the second photosensitive pixel train, a holding section for holding the signal charges which have been transferred at the first interpixel shift section, and a second interpixel shift section for carrying out shift or transfer operation of the signal charges held at the holding section to the third photosensitive pixel train.

Moreover, in accordance with the second aspect of this invention, there is provided a control method for a color linear image sensor comprising: first, second and third photosensitive pixel trains closely disposed substantially in parallel to each other and adapted for respectively producing signal charges with respect to different colors; a first charge transfer section disposed substantially in parallel to the first photosensitive pixel train and adapted for transferring a series of signal charges produced at the first photosensitive pixel train; a second charge transfer section disposed substantially in parallel to the third photosensitive pixel train and adapted for transferring the signal charges produced at the second photosensitive pixel train; a first shift section disposed between the first photosensitive pixel train and the first charge transfer section and adapted for carrying out shift or transfer operation of the signal charges produced at the first photosensitive pixel train to the first charge transfer section; a second shift section disposed between the third photosensitive pixel train and the second charge transfer section and adapted for carrying out shift or transfer operation of the signal charges produced at the photosensitive pixel train to the second charge transfer section through the third photosensitive pixel train; and an interpixel transfer section provided between the second photosensitive pixel train and the third photosensitive pixel train and adapted for carrying out shift or transfer operation of the signal charges produced at the second photosensitive pixel train to the third photosensitive pixel train while holding them, the method comprises: a process step of carrying out shift or transfer operation of signal charges produced at the second photosensitive pixel train to the interpixel transfer section; a process step of holding, for a predetermined time, the signal charges which have been transferred within the interpixel transfer section; and a process step of carrying out shift or transfer operation of the held signal charges to the third photosensitive pixel train after the predetermined holding time is passed.

BRIEF DESCRIPTION OF THE DRAWINGS

In the accompanying drawings.

DESCRIPTION OF THE PREFERRED EMBODIMENTS

Preferred embodiments of this invention will now be described with reference to the attached drawings.

Figure 1:
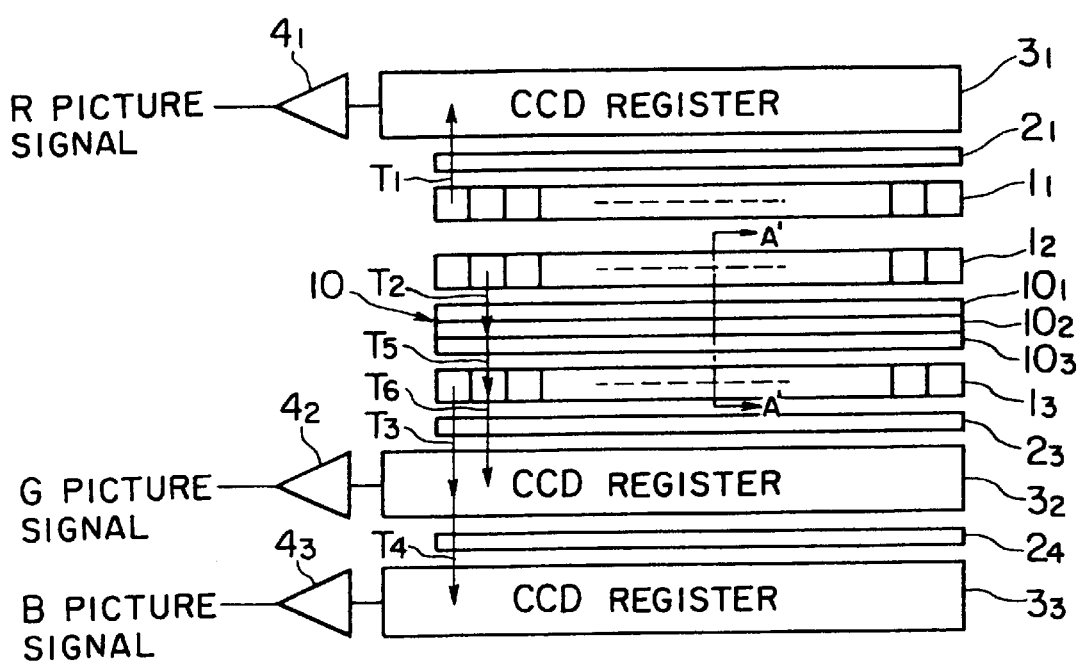
FIG. 1 is a model view for explaining an embodiment of a solid state image sensing device of this invention.
Figure 9:
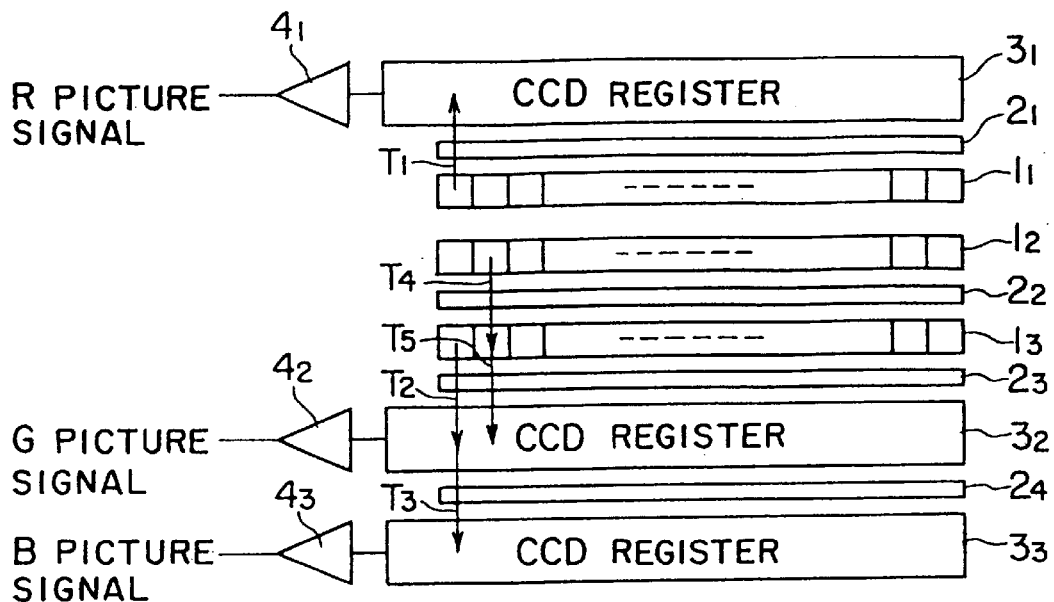
FIG. 9 is a model view showing an example of a conventional line proximity type sensor.
Figure 10:
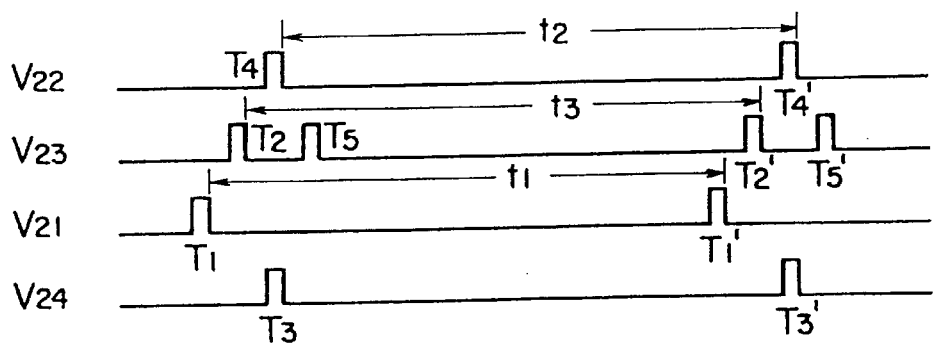
FIG. 10 is a signal timing diagram for explaining the operation of the line proximity type sensor of FIG. 9.

FIG. 1 is a model view showing a first embodiment of a color linear image sensor according to this invention, and the same reference numerals are respectively attached to the portions corresponding to those of FIG. 9.

Similarly to the case of FIG. 9, this 3-line CCD linear image sensor includes photosensitive pixel trains $1_1$, $1_2$, $1_3$ disposed in parallel to each other, and different color filters (not shown) formed above the respective photosensitive pixel trains. It is now assumed that red (R) filter is formed above the photosensitive pixel train $1_1$, green (G) filter is formed above the photosensitive pixel train $1_2$, and blue (B) filter is formed above the photosensitive pixel train $1_3$. As a result, the photosensitive pixel trains $1_1$, $1_2$, $1_3$ produce a group of signal charges corresponding to one scanning in dependency upon light quantity of image projected through optical system (not shown). Thus, the red component, the green component and the blue component of the image are respectively taken out.

In order to transfer signal charges produced at the respective photosensitive pixel trains, CCD registers $3_1$–$3_3$ are provided. In FIG. 1, the CCD register $3_1$ is disposed in parallel at the side opposite to the photosensitive pixel train $1_2$ of the photosensitive pixel train $1_1$, and two CCD registers $3_2$ and $3_3$ are disposed in parallel at the side opposite to the photosensitive pixel train $1_1$ of the photosensitive pixel trains $1_2$ and $1_3$.

Between the photosensitive pixel train $1_1$ and the CCD register $3_1$, a shift section $2_1$ is provided. Between the photosensitive pixel train $1_3$ and the CCD register $3_2$, a shift section $2_3$ is provided. Between the CCD register $3_2$ and the CCD register $3_3$, a shift section $2_4$ is provided.

At the front end portions in the transfer direction of the respective CCD registers $3_1$–$3_3$, there are respectively provided amplifiers $4_1$–$4_3$ for converting output charges of the CCD registers $3_1$–$3_3$ into electric signals to output them as picture signals of R, G and B.

Between the photosensitive pixel trains $1_2$ and $1_3$, an interpixel transfer section 10 is provided unlike the case of FIG. 9. This interpixel transfer section 10 is composed of a shift section $10_1$ comprised of transfer electrode for taking thereinto signal charges from the photosensitive pixel train $1_2$, a holding section $10_2$ comprised of electrode for holding the signal charges thus taken in, and a shift section $10_3$ comprised of transfer electrode for transferring the signal charges held in the holding section $10_2$ to the photosensitive pixel train $1_3$.

Figure 2:
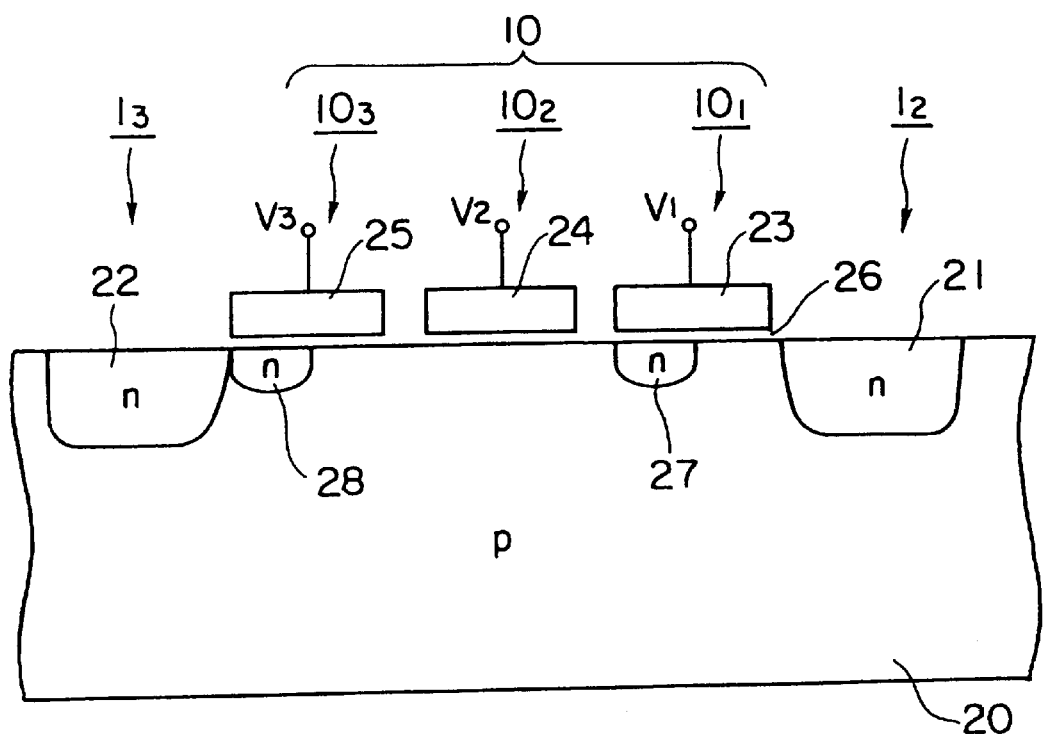
FIG. 2 is a device cross sectional view showing the configuration of the main part of the solid state image sensing device shown in FIG. 1.

FIG. 2 is a device cross sectional view showing A–A' cross section in FIG. 1, and shows the detail of the interpixel transfer section. At the portions of the photosensitive pixel trains $1_2$, $1_3$ on the surface of a p-type semiconductor substrate 20, n-type impurity diffusion (diffused) regions 21, 22 are respectively provided so that photodiode is formed. Moreover, on the portion of the interpixel transfer section 10 of the substrate, electrodes 23, 24, 25 comprised of polysilicon are formed at predetermined intervals through an insulating film 26. On the substrate surface below the electrodes 23 and 25, n-type impurity diffusion regions 27, 28 are respectively provided at the substantially half portion of the transfer destination side.

Figure 3:
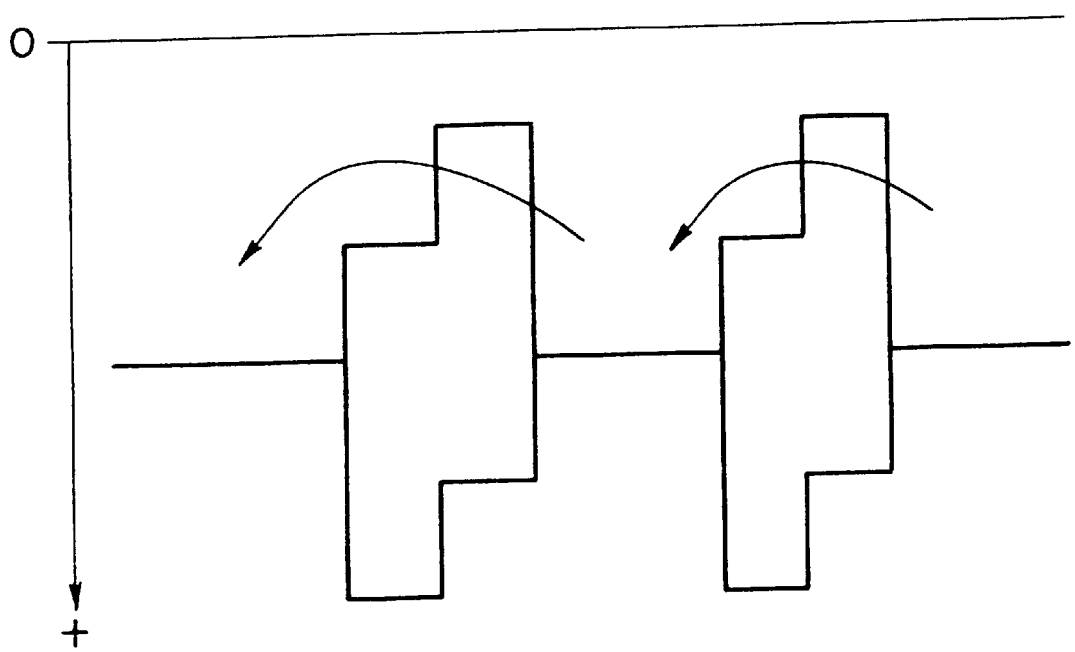
FIG. 3 is a potential diagram showing the state of movement of signal charges in interpixel transfer section.

In such a structure, the state for transferring signal charges produced at the photosensitive pixel trains is shown in the potential diagram of FIG. 3.

Pulses of which levels change are applied to the electrodes 23 and 25 from control section (not shown) as shift pulse. However, since n regions are provided at a portion thereof below these electrodes, potential change as shown in FIG. 3 takes place. Moreover, a suitable constant voltage $V_2$ is applied to the electrode 24 of the holding section, and the depth of that potential is constant at all times. As a result, signal charges are transferred from the photosensitive pixel 21 to the holding section $10_2$ by the shift pulse $V_1$ applied to the electrode 23, and are transferred to the photosensitive pixel 22 by shift pulse $V_3$ applied to the electrode 25 at a different timing.

By independently controlling the shift pulses applied to the electrodes 23 and 25, signal charges produced at the photosensitive pixel train $1_2$ are first transferred to the holding section $10_2$ by the shift section $10_1$ so that they are held, thus making it possible to carry out shift or transfer operation thereof to the photosensitive pixel train $1_3$ by the shift section $10_3$ after suitable holding time.

Figure 4:
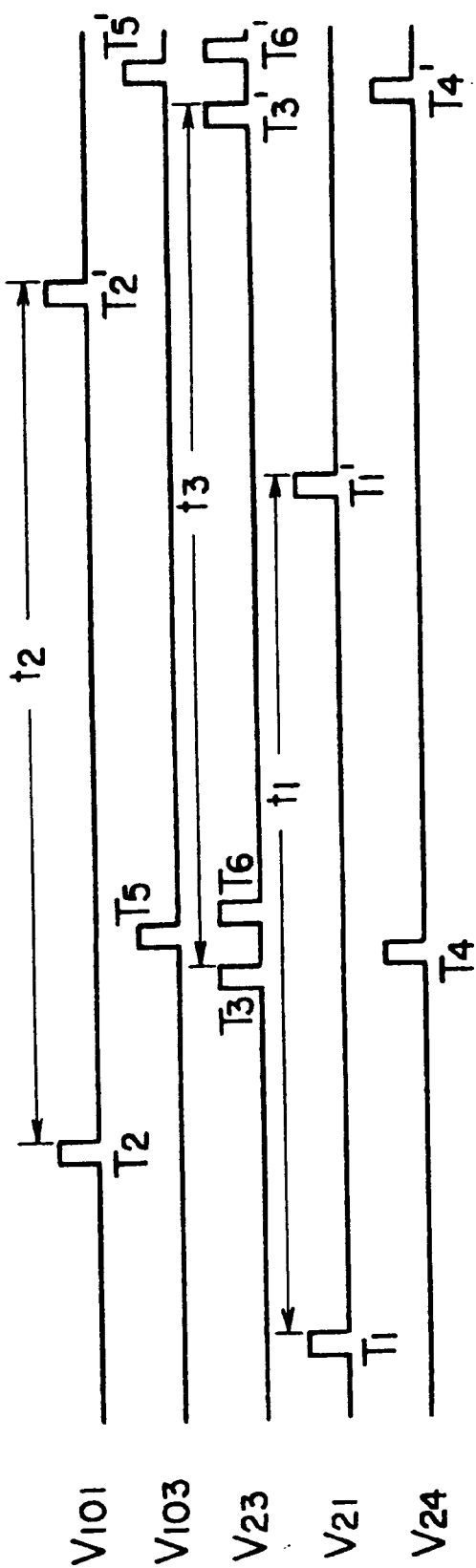
FIG. 4 is a timing chart showing read-out operation in this invention.

FIG. 4 is a timing chart showing the operation in the color linear image sensor according to this invention.

Initially, at time $T_1$, drive voltage pulse $V_{21}$ is applied to the shift section $2_1$ from control section (not shown). As a result, signal charges produced at the photosensitive pixel train $1_1$ are transferred to the CCD register $3_1$ through the shift section $2_1$. At time $T_2$, drive voltage pulse $V_{101}$ is applied to the shift section $10_1$. As a result, signal charges produced at the photosensitive pixel train $1_2$ are transferred to the holding section $10_2$, at which they are held for a necessary time. At time $T_3$, drive voltage pulse $V_{23}$ is applied to the shift section $2_3$. As a result, signal charges produced at the photosensitive pixel train $1_3$ are transferred to the CCD register $3_2$ through the shift section $2_3$. At time $T_4$, drive voltage pulse $V_{24}$ is applied to the shift section $2_4$. As a result, signal charges held at the CCD register $3_2$ are transferred to the CCD register $3_3$ through the shift section $2_4$. At time $T_5$, drive voltage pulse $V_{103}$ is applied to the shift section $10_3$. As a result, signal charges held at the holding section $10_2$ are transferred to the photosensitive pixel train $1_3$ through the shift section $10_3$. At time $T_6$, drive voltage pulse $V_{23}$ is applied to the shift section $2_3$. As a result, signal charges held at the photosensitive pixel train $1_3$ are transferred to the CCD register $3_2$ through the shift section $2_3$.

Accordingly, signal charges of the photosensitive pixel train $1_1$ are held in the CCD register $3_1$ signal charges of the photosensitive pixel train $1_2$ are held in the CCD register $3_2$, and signal charges of the photosensitive pixel train $1_3$ are held in the CCD register $3_3$. The signal charges held in the respective CCD registers are outputted through amplifiers at suitable timings. Further, generation of drive voltage pulses at times $T_1'$, $T_2'$ . . . is repeated. Thus, image thus read is outputted. In this example, signal storage time $t_1$ at the photosensitive pixel train $1_1$ is expressed as $t_1=T_1-T_1'$, signal storage time $t_2$ at the photosensitive pixel train $1_2$ is expressed as $t_2=T_2-T_2'$, and signal storage time $t_3$ at the photosensitive pixel train $1_3$ is expressed as $t_3=T_3-T_3'$, In this case, $t_1=t_2$ and $t_3$ is value approximate to $t_2$.

Figure 5:
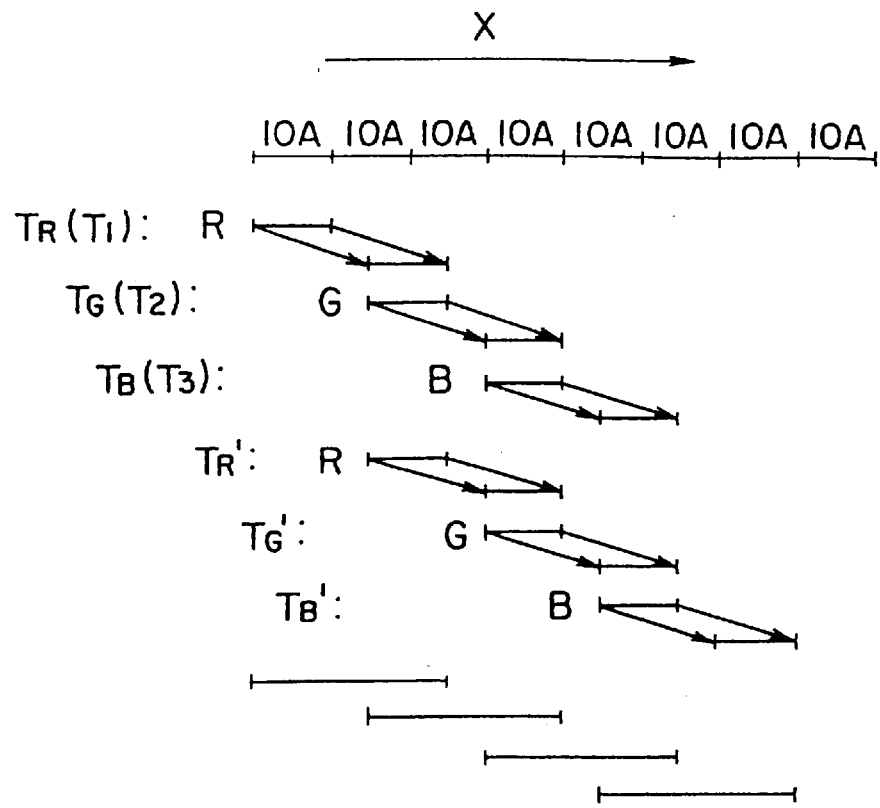
FIG. 5 is a model view for explaining adjustment operation at integral start time point in this invention.
Figure 8:
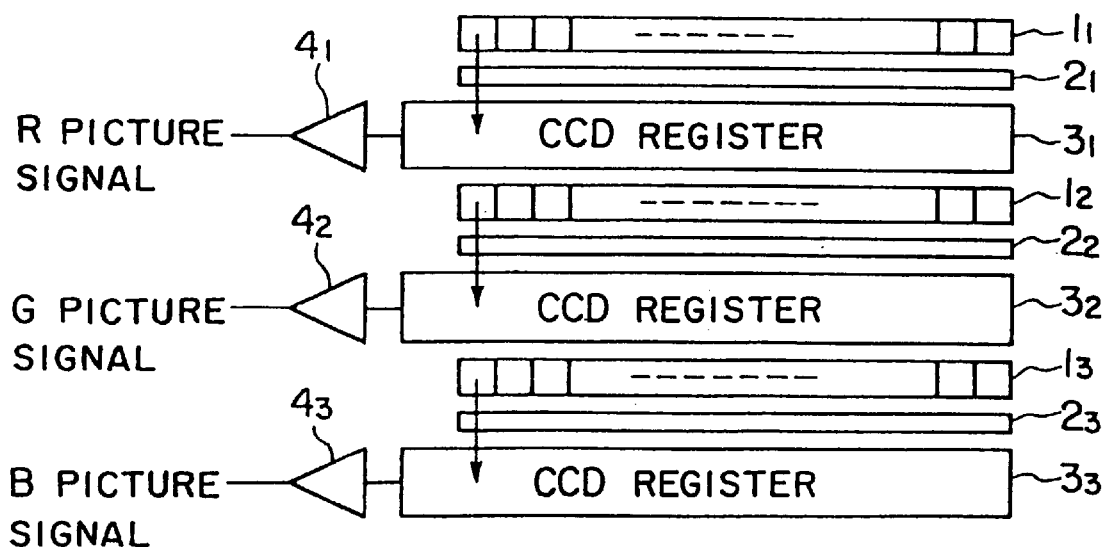
FIG. 8 is a model view showing an example of a conventional 3-line sensor.
Figure 11A:
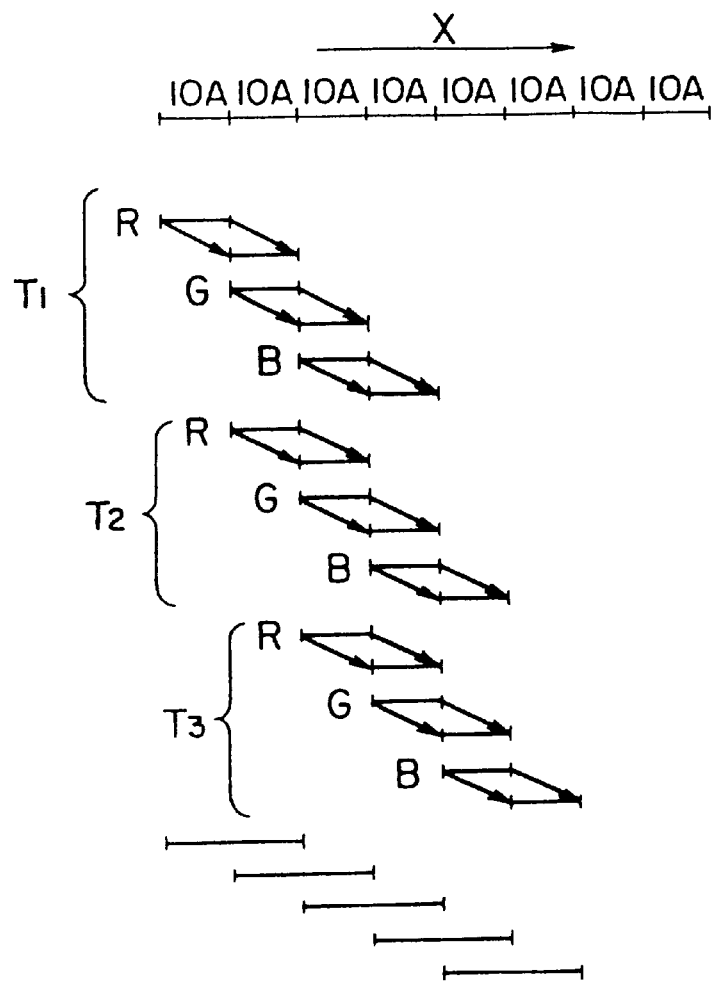
FIGS. 11A, 11B are model views respectively showing the state where the pixel opening is moved in the subscanning direction on manuscript.
Figure 11B:
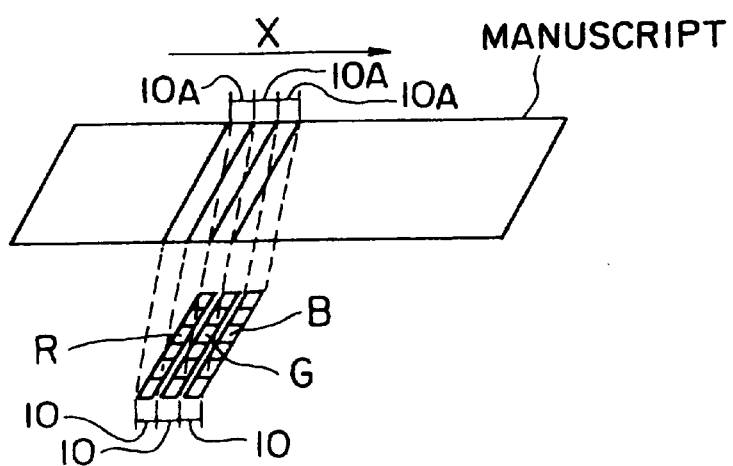
Figure 12:
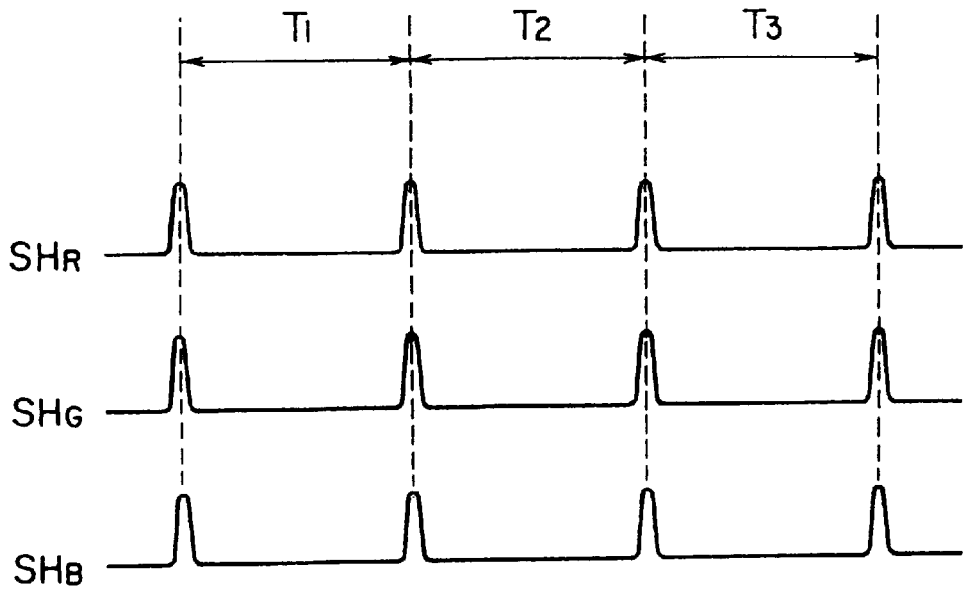
FIG. 12 is a timing chart showing read-out timing.
Figure 13:
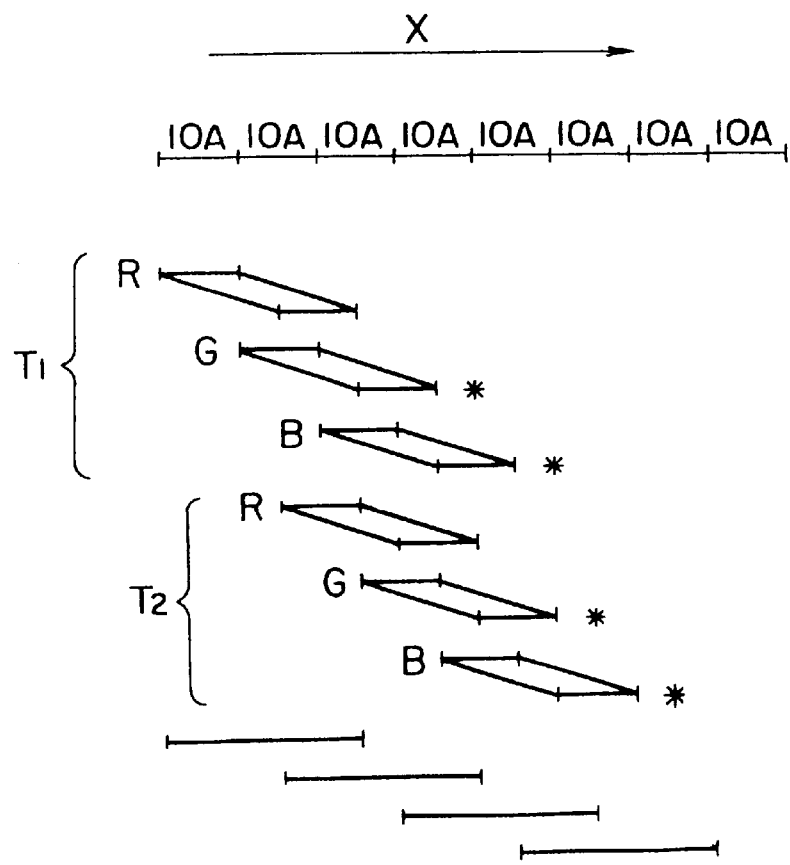
FIG. 13 is a model view showing the state of movement of the pixel opening in the case where scanning 1.5 times faster than that in the scanning of FIG. 11 is carried out.
Figure 14:
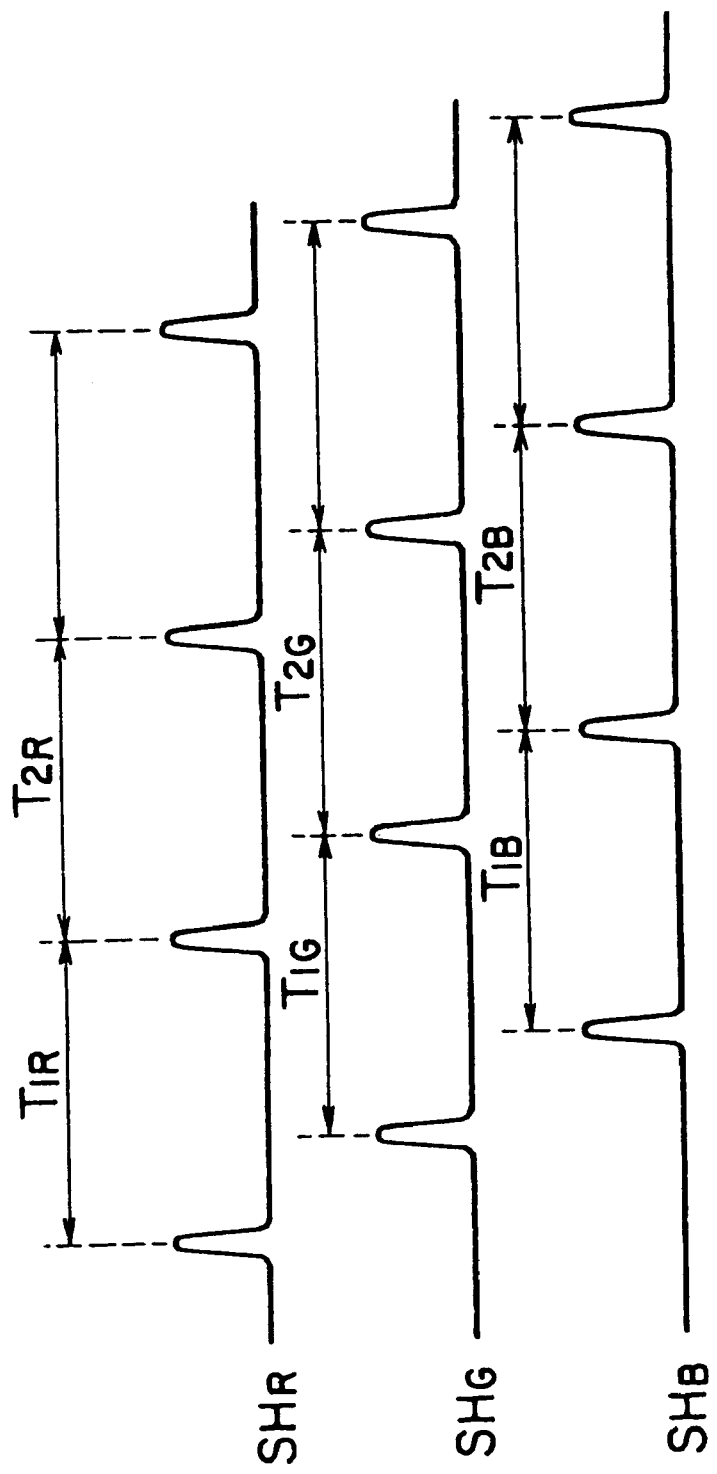
FIG. 14 is a timing chart showing read-out timing in the case of FIG. 13.

FIG. 5 is a view corresponding to FIG. 11A, and is a model view showing the state where the pixel openings are moved in the subscanning direction X on the manuscript. In this figure, scanning of 1.5 times is carried out and timing is shifted by ⅓ period. Since such an approach is employed, the ranges within which respective pixels are moved are in correspondence with the ranges where they are to be primarily moved, which are shown at the lower portion. Thus, pixels of three colors read the same portion.

As stated above, the provision of the interpixel transfer section 10 makes it possible to arbitrarily set intervals between respective drive voltage pulses at the times $T_2$ and $T_3$. Particularly, respective pulse positions which should correspond to the times $T_1$, $T_2$, $T_3$ are individually set, thereby making it possible to independently determine positions of signal charge storage time periods $t_1-t_3$ on the time axis, and to set the signal storage times to values substantially equal to each other. In more practical sense, the holding time in the interpixel transfer section 10 of signal charges produced at the photosensitive pixel train $1_2$ corresponding to time (time period) from the time $T_2-T_5$ is determined in dependency upon suitable positions of signal storage time periods $t_1-t_3$ of the respective photosensitive pixel trains determined from the pitch between the photosensitive pixel trains and the scanning speed, thereby permitting reading positions by the respective photosensitive pixel trains to be substantially in correspondence with each other.

Figure 6:
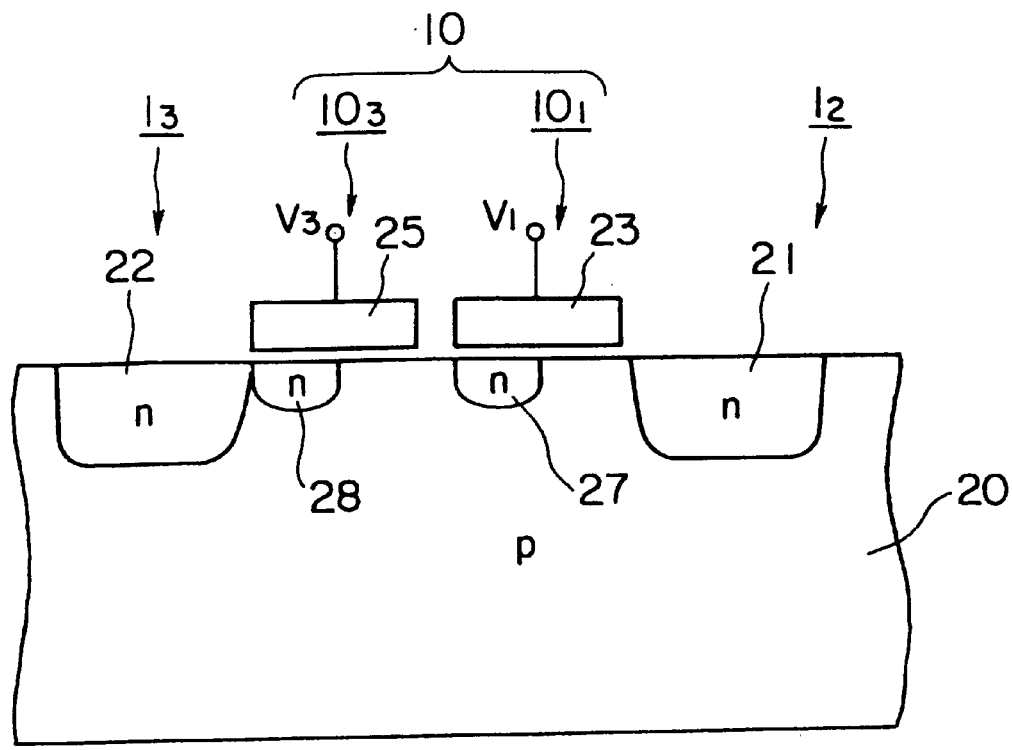
FIG. 6 is a device cross sectional view showing another example of interpixel transfer section.
Figure 7:
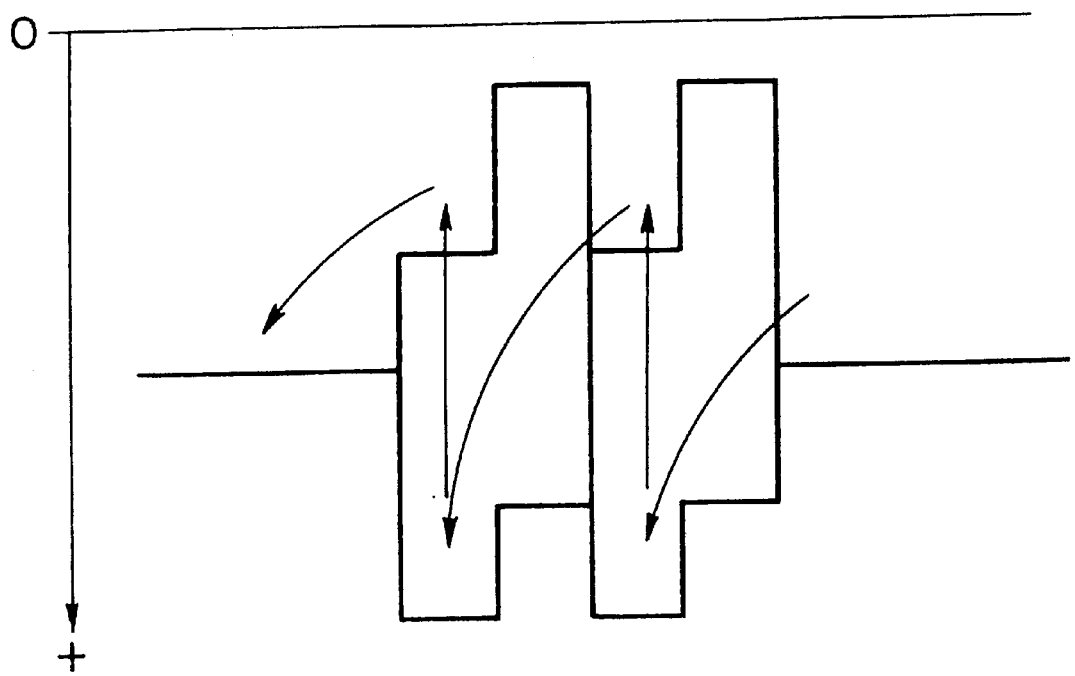
FIG. 7 is a potential diagram showing transfer operation in FIG. 6.

The interpixel transfer section 10 may be constituted so as to have cross sectional structure as shown in FIG. 6. In this example, there is employed the configuration in which the holding section $10_2$ in FIG. 2 is omitted. However, since $n^+$ regions 27, 28 are respectively provided at substantially half portion of the transfer destination side on the substrate surface below the electrodes 23 and 25, signal charges are accumulated (stored) at the portion of deep potential as shown in the potential diagram of FIG. 7, thereby making it possible to carry out hold and shift operations of signal charges.

While independent second and third CCD registers are used for the purpose of taking out G picture signal and B picture signal in the above-described embodiments, timing may be adjusted to thereby transfer signals from two photosensitive pixel trains only by single second CCD register. In addition, it is a matter of course that, e.g., reset section comprised of overflow drain structure may be provided to carry out an operation for discharging excess signal charges to the reset section at a desired timing.

As stated above, in accordance with this invention, since the interpixel transfer section is provided between the photosensitive pixel trains close to each other, it becomes possible to independently control positions on the time axis of storage time period during which respective photosensitive pixel trains store signal charges. This is suitable for image sensors having enlargement/contraction function because of ability to change the resolution in the subscanning direction.

What is claimed is:

1. A solid state image sensing device comprising:

plural reading pixel trains disposed in parallel, each reading pixel trains being provided for taking out respective one of color signal charges of plural different colors;

plural charge transfer sections disposed substantially in parallel to the reading pixel trains, each being provided in correspondence with the plural reading pixel trains in order to serially transfer a series of signal charges;

plural shift sections disposed between the reading pixel trains and the charge transfer sections in order to carry out shift or transfer operation of the series of signal charges respectively produced in the plural reading pixel trains; and an interpixel transfer section disposed between a first and second reading pixel train of said plural reading pixel trains for different colors and adapted for temporarily storing the series of signal charges of the first reading pixel train and for transferring the stored signal charges to the second reading pixel train.

2. A color linear image sensor comprising:

first, second and third photosensitive pixel trains closely disposed substantially in parallel to each other and adapted for respectively producing signal charges with respect to first, second and third colors which are different from each other;

a first charge transfer section disposed substantially in parallel to the first photosensitive pixel train for the first color and adapted for transferring a series of signal charges of the first color produced at the first photosensitive pixel train;

a second charge transfer section disposed substantially in parallel to the third photosensitive pixel train for the third color and adapted for transferring the signal charges of the second color produced at the second photosensitive pixel train;

a first shift section disposed between the first photosensitive pixel train and the first charge transfer section and adapted for carrying out shift or transfer operation of the signal charges produced at the first photosensitive pixel train to the first charge transfer section;

a second shift section disposed between the third photosensitive pixel train and the second charge transfer section and adapted for carrying out shift or transfer operation of the signal charges of the second color produced at the second photosensitive pixel train to the second charge transfer section through the third photosensitive pixel train; and an interpixel transfer section provided between the second photosensitive pixel train for the second color and the third photosensitive pixel train for the third color and adapted for carrying out shift or transfer operation of the signal charges of the second color produced at the second photosensitive pixel train while holding them.

3. A color linear image sensor as set forth in claim 2, wherein the interpixel transfer section comprises:

a first interpixel shift section for carrying out shift or transfer operation of the signal charges produced at the second photosensitive pixel train, a holding section for holding the signal charges which have been caused to undergo shift or transfer operation by the first interpixel shift section, and a second interpixel shift section for carrying out shift or transfer operation of the signal charges held at the holding section to the third photosensitive pixel train.

4. A color linear image sensor as set forth in claim 3, which comprises first, second and third electrodes formed through an insulating film on a semiconductor substrate respectively in correspondence with the first interpixel shift section, the holding section and the second interpixel shift section.

5. A color linear image sensor as set forth in claim 4, wherein, at the time of shift operation, shift pulses are respectively applied to the first and third electrodes, and a constant (fixed) potential is applied to the second electrode.

6. A color linear image sensor as set forth in claim 4, wherein the first and second interpixel shift sections each comprise an impurity diffusion region of deep potential formed at the front portion in a shift direction at the surface of the semiconductor substrate.

7. A color linear image sensor as set forth in claim 6, wherein the impurity diffusion region has conductivity type opposite to that of the semiconductor substrate.

8. A color linear image sensor as set forth in claim 2, wherein the interpixel transfer section comprises a first interpixel shift section for carrying out shift or transfer operation of signal charges produced at the second photosensitive pixel train, and a second interpixel shift section for carrying out shift or transfer operation of the signal charges held at the first interpixel shift section to the third photosensitive pixel train.

9. A color linear image sensor as set forth in claim 8, wherein the first and second interpixel shift sections each have an impurity diffusion region of deep potential formed at the front portion in a shift direction at the surface of the semiconductor substrate, and comprises first and second electrodes formed through an insulating film on the semiconductor substrate.

10. A color linear image sensor as set forth in claim 9, wherein the impurity diffusion region has conductivity type opposite to that of the semiconductor substrate.

11. A color linear image sensor as set forth in claim 9, wherein first and second shift pulses are respectively applied to the first and third electrodes, and read-out timing is adjusted so as to store signal charges into the impurity diffusion region of deep potential.

12. A color linear image sensor as set forth in claim 2, wherein filters of colors different from each other which are selected from red, blue and green are respectively formed on the first, second and third photosensitive pixel trains.

13. A color linear image sensor as set forth in claim 2, wherein the first and second charge transfer sections are respectively comprised of CCD registers.

14. A color linear image sensor as set forth in claim 2, which further comprises a third charge transfer section disposed substantially in parallel to the second charge transfer section, and a third shift section disposed between the second and third charge transfer sections.

15. A color linear image sensor as set forth in claim 14, wherein the third charge transfer section transfers signal charges produced at the third photosensitive pixel train.

16. A color linear image sensor as set forth in claim 14, wherein the third charge transfer section is comprised of CCD register.

17. A control method for a color linear image sensor as set forth in claim 2, the method comprising:

a step of carrying out shift or transfer operation of the signal charges produced at the second photosensitive pixel train to the interpixel transfer section;

a step of holding, for a predetermined time, the signal charges which have been caused to shift or transfer operation within the interpixel transfer section; and a step of carrying out shift or transfer operation of the held signal charges to the third photosensitive pixel train after the predetermined holding time is passed.

18. A control method for a color linear image sensor as set forth in claim 17, wherein the holding time is determined by pitch between the photosensitive pixel trains and scanning speed.

19. A control method for a color linear image sensor as set forth in claim 17, wherein the first, second and third photosensitive pixel trains are respectively scanned every substantially same position through a series of read-out timings.

20. A solid state image sensing device comprising:

plural reading pixel trains disposed in parallel, each reading pixel train being provided for taking out respective one of color signal charges of plural different colors;

plural charge transfer sections disposed substantially in parallel to the reading pixel trains, each being provided in correspondence with the plural reading pixel trains in order to serially transfer a series of signal charges;

plural shift sections disposed between the reading pixel trains and the charge transfer sections in order to carry out shift or transfer operation of the series of signal charges respectively produced in the plural reading pixel trains, and an interpixel transfer section disposed between two of the reading pixel trains of said plural reading pixel trains for different colors and adapted for temporarily storing the series of signal charges of one reading pixel train and for transferring the stored signal charges to another reading pixel train, wherein timings for transferring signal charges from the respective reading pixel trains to corresponding charge transfer sections are changeable in response to a required resolution.

21. A solid state image sensing device according to claim 20, wherein a first timing of charge transfer from said one reading pixel train to the interpixel transfer section and a second timing of charge transfer from said another reading pixel train to the second shift section are changeable in response to the required resolution.

* * * * *